United States Patent [19]

Baker

[11] 4,234,131
[45] Nov. 18, 1980

[54] MOTORIZED DRY FERTILIZER SPREADER

[75] Inventor: Douglas W. Baker, Dayton, Ohio

[73] Assignee: Leisure Lawn, Inc., Dayton, Ohio

[21] Appl. No.: 4,585

[22] Filed: Jan. 18, 1979

[51] Int. Cl.³ ............................................. A01C 17/00
[52] U.S. Cl. ................................ 239/685; 180/70 R; 222/626; 239/687
[58] Field of Search ............... 239/684, 685, 663, 687; 222/608, 626; 180/72, 70 R

[56] References Cited

U.S. PATENT DOCUMENTS

| | | | |
|---|---|---|---|
| 351,988 | 11/1886 | Lord | 239/687 |
| 2,758,842 | 8/1956 | Burroff | 239/687 |
| 2,847,224 | 8/1958 | Stout | 239/663 X |
| 3,512,599 | 5/1970 | Hott et al. | 180/70 R X |
| 3,523,648 | 8/1970 | Garber | 239/687 X |
| 4,032,074 | 6/1977 | Amerine | 239/685 |

Primary Examiner—Andres Kashnikow
Attorney, Agent, or Firm—Becker & Becker, Inc.

[57] ABSTRACT

An impeller blade spreader for dry fertilizer to be distributed uniformly over a lawn area has a standard fiber glass hopper that is mounted upon a base frame structure in combination with four wheels and a fuel powered motor therewith. Only the two front wheels are used for driving purposes. A timing and revolution interconnection to the impeller blade is combined with the motor used simultaneously for front wheel drive connection on the dry fertilizer spreader. A rod and lever engagement is provided for positive control of engagement of the transmission for transfer of driving power to the motorized front wheel drive and control of the opening and closing of the holes in the bottom of the hopper above the impeller blade of the dry fertilizer spreader to let dry fertilizer fall onto the spinning stainless steel impeller blade.

20 Claims, 11 Drawing Figures

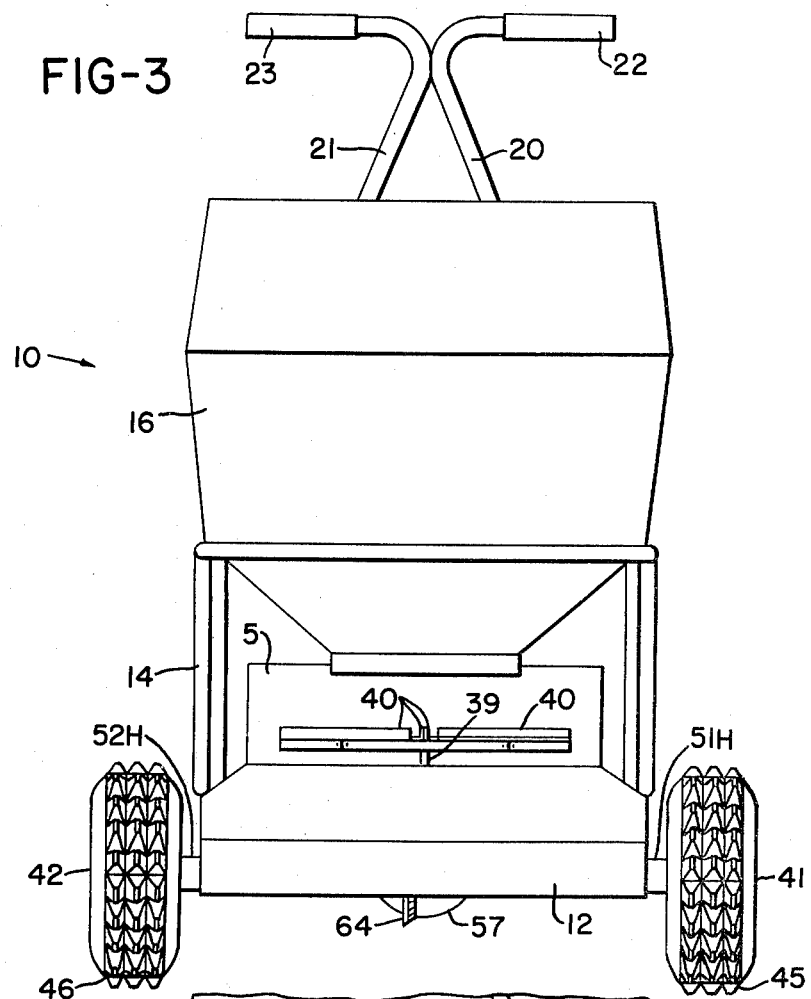
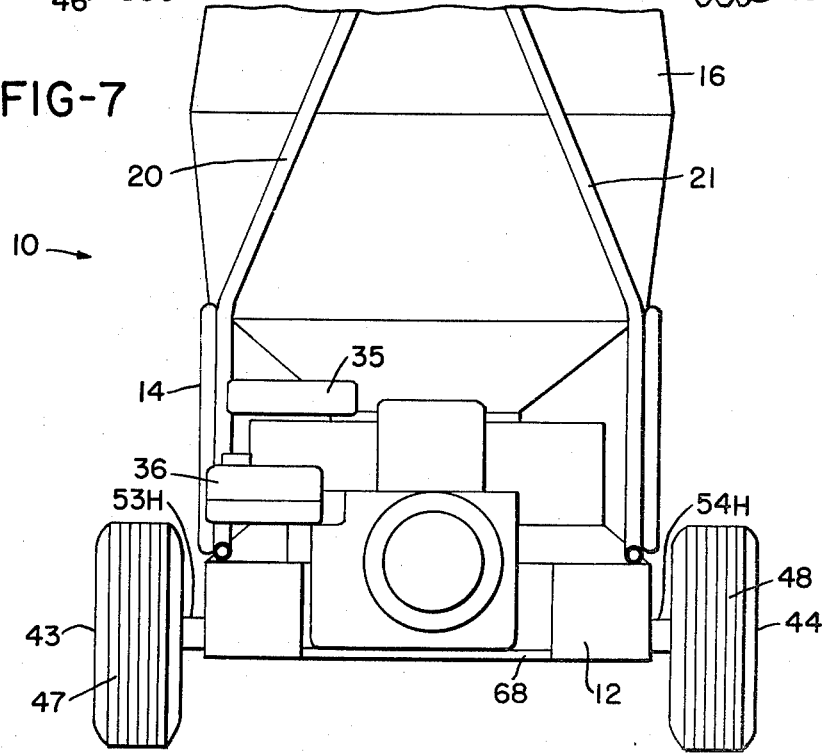

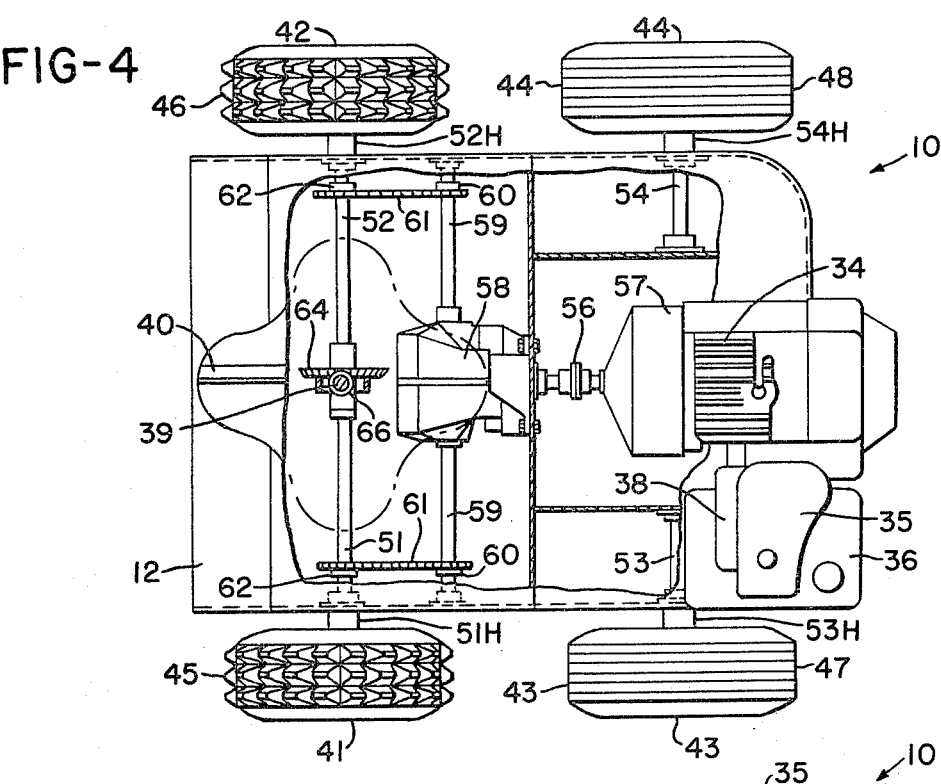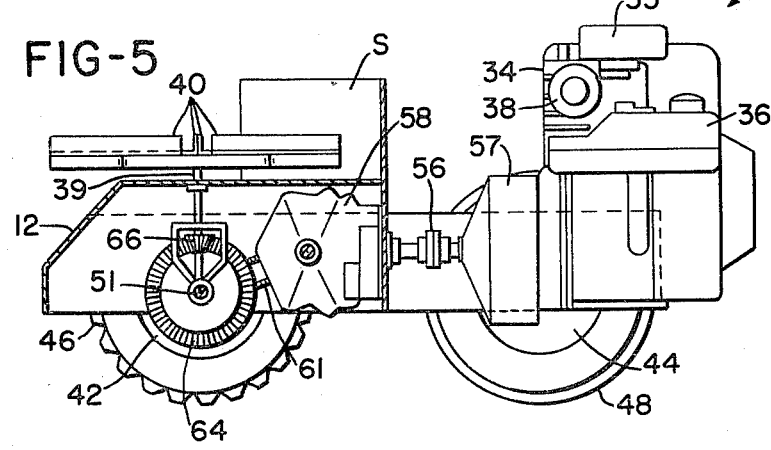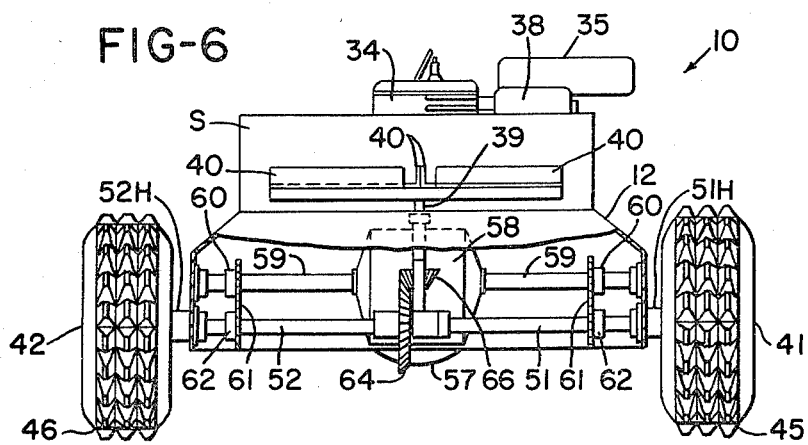

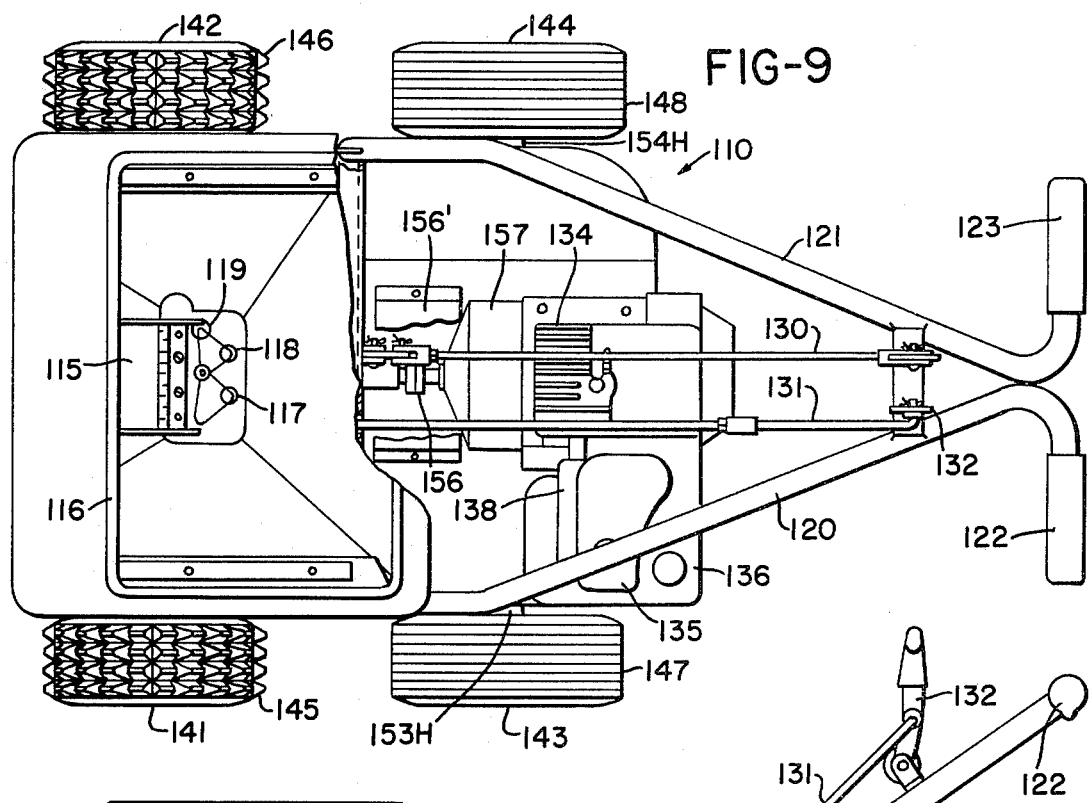
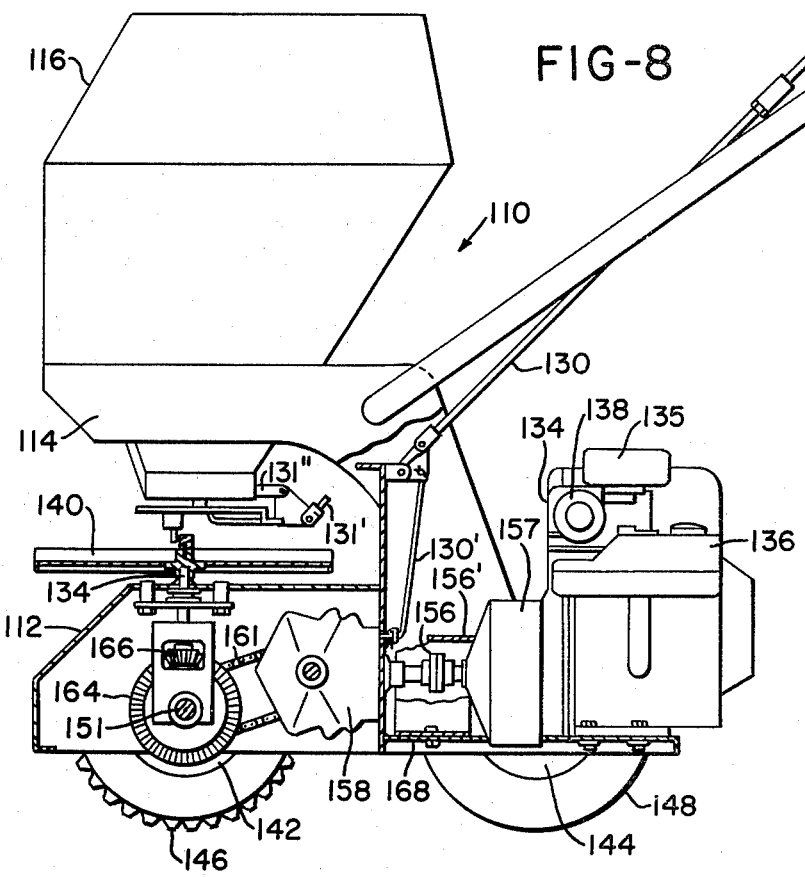

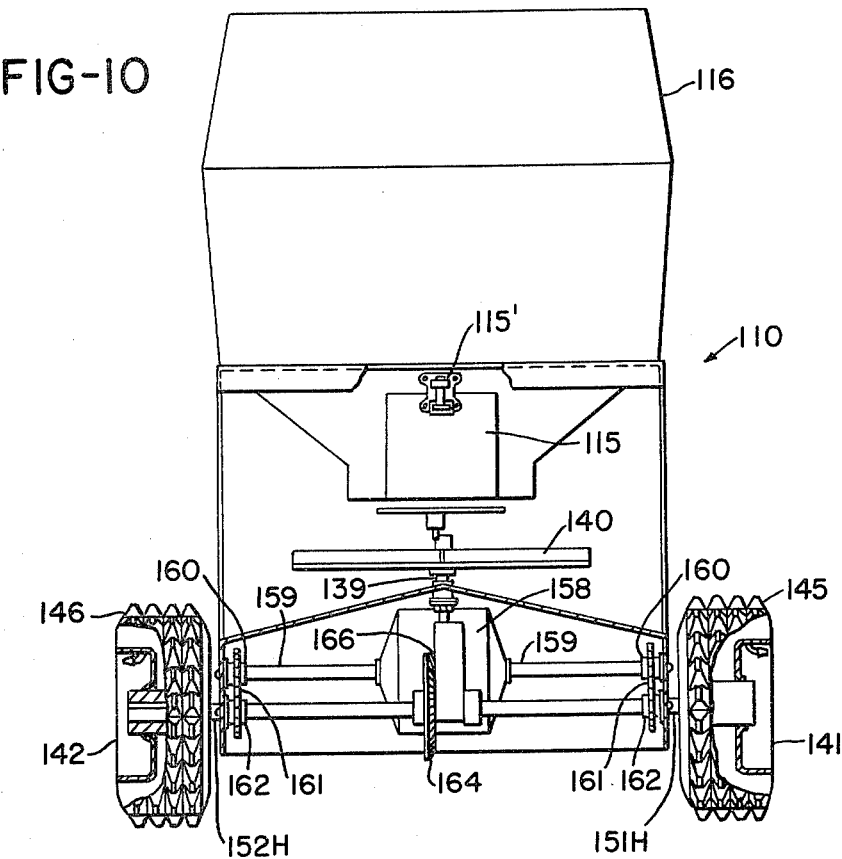
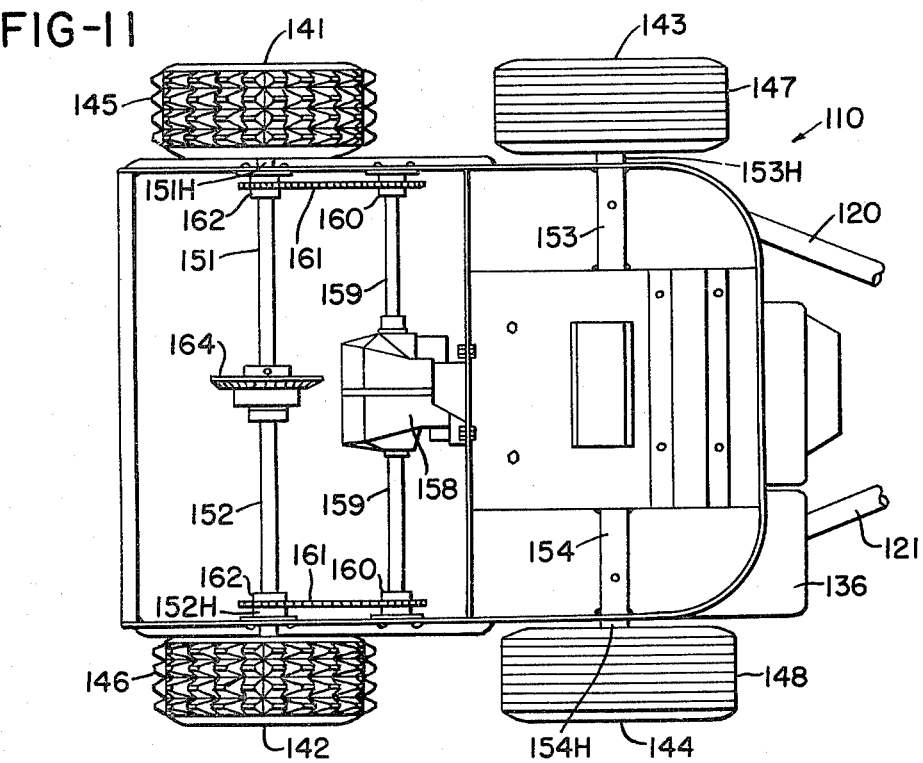

MOTORIZED DRY FERTILIZER SPREADER

BACKGROUND OF THE INVENTION

1. Field of the Invention

The present invention relates to apparatus used by lawn service companies and individuals for lawn care purposes. The motorized dry fertilizer spreader is capable of pulling up to sixty pounds weight where more strength is needed otherwise to push spreaders.

2. Description of the Prior Art

A motorized impeller blade has been provided on spreaders. However, in view of younger help employed by lawn service companies, more strength is needed to propel and push spreaders over lawn area for uniform distribution of dry fertilizer. Such uniform distribution is not always certain if human energy is dissipated and a problem of tiring sets in for the individual trying to carry out the dry fertilizer spreading operation.

SUMMARY OF THE INVENTION

Main Features

The present invention seeks to overcome the aforementioned problem. A dry fertilizer spreader with a revolving impeller blade at least partially within confines of an impeller shield below a fertilizer hopper is mounted upon a substantially rectangular base frame steel structure to journal four wheels rotatably therewith; a gasoline-powered engine with an elevated gas tank of up to one-half gallon capacity and an elevated foam-type air cleaner is mounted securely on an engine tray at the rear of the steel frame structure in a compact recess location underneath a handle behind and below the standard fiberglass hopper. The impeller blade below the standard fiberglass hopper is gear driven by way of a direct drive transmission which simultaneously turns a pair of shafts extending axially in opposite lateral directions. Sprocket gears on the shafts are driven simultaneously and synchronously timed with the steel bevel gear drive for the rotatable impeller blade mounted on a shaft journalled vertically by the base frame structure. A pair of parallel chains mesh with the sprocket gears on the shafts. The chains drivingly engage driven sprockets connected to axle means for journalling the front pair of wheel positively and uniformly driven thereby. A rod and two-lever position engagement between the handle and motor driven impeller and front wheel drive is combined with timing and revolution interconnection to assure against undesired dry fertilizer spreading except when positively actuated for wide range spreading of up to 60 pounds of dry fertilizer material from the lightweight standard fiberglass hopper.

An object of the present invention is to combine front wheel drive and motorized impeller blade operation with positive rod and lever control of a large capacity dry fertilizer spreader having a hopper, handle and four wheels.

Other objects, features, and advantages of the invention will become more apparent with reference to the succeeding detailed description thereof and to the drawings illustrating preferred embodiments thereof.

BRIEF DESCRIPTION OF THE DRAWINGS

FIG. 3 is a front elevational view of the spreader of FIGS. 1 and 2.

FIG. 4 is a partially sectioned plan view of the spreader having drive mechanism in accordance with the present invention.

FIG. 5 is a side view of the mechanism of FIG. 4.

FIG. 6 is an end elevational view of the mechanism of FIGS. 4 and 5.

FIG. 7 is a rear elevational view of the motorized spreader in accordance with the present invention.

FIGS. 8, 9, 10 and 11 show a further embodiment of a power lawn spreader in views corresponding to those of FIGS. 1, 2, 3 and 4 respectively.

DETAILED DESCRIPTION FOR PREFERRED EMBODIMENTS

Figure 1:
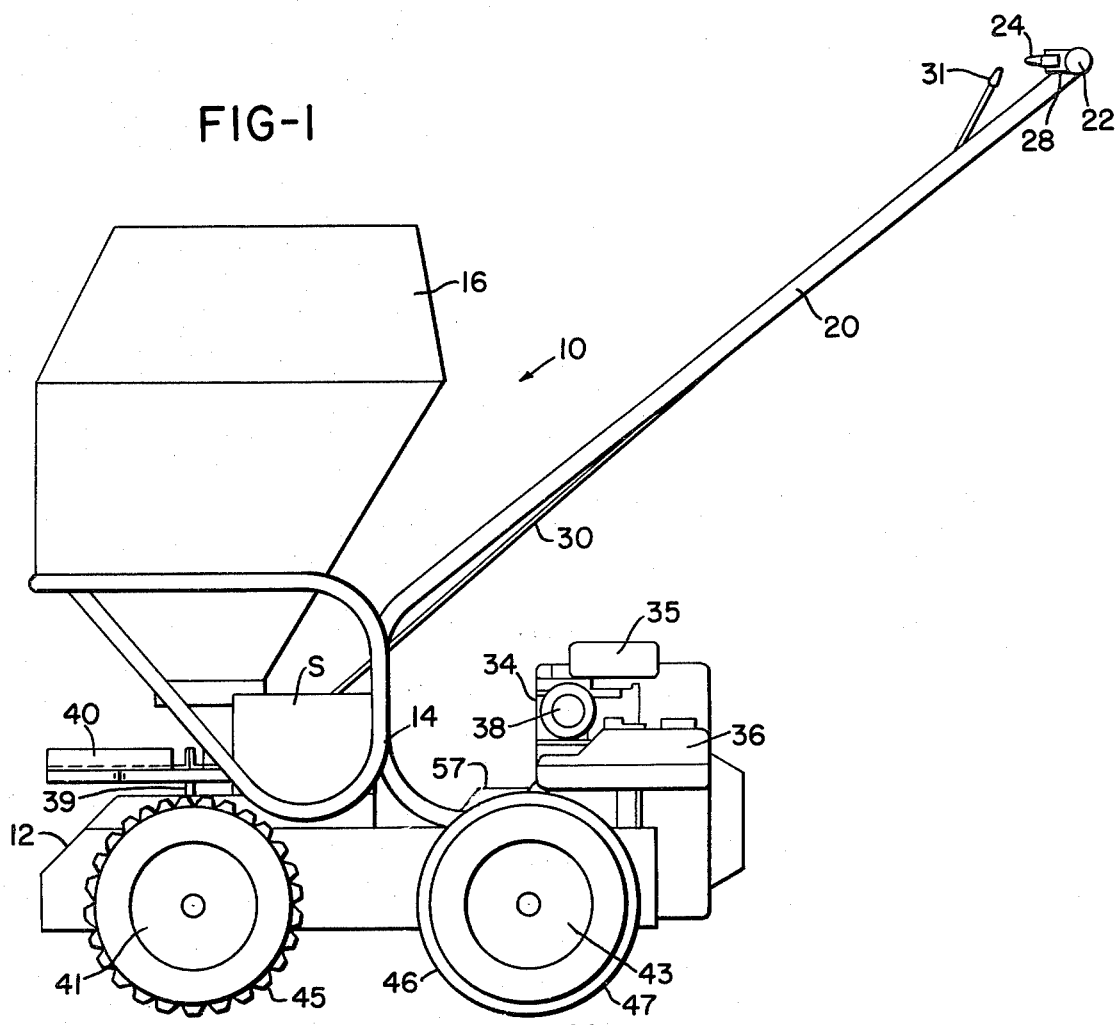
FIG. 1 is a side elevational view of a motorized dry fertilizer spreader in accordance with the present invention.
Figure 2:
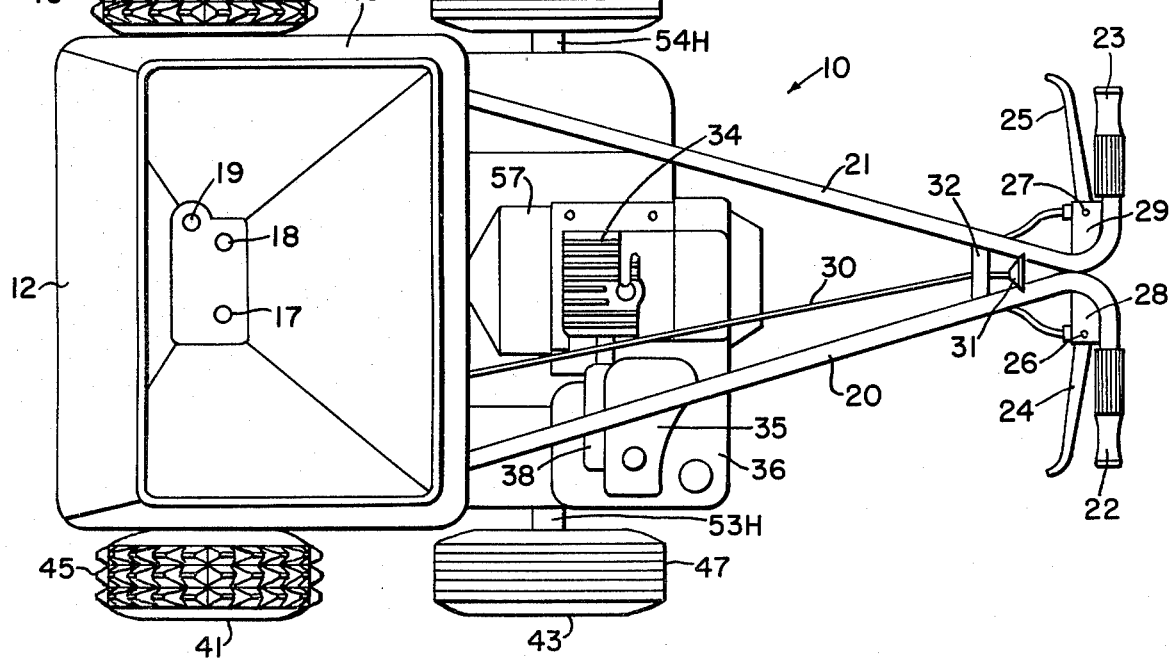
FIG. 2 is a top plan view of the spreader of FIG. 1.

FIGS. 2 and 3 show a motorized dry fertilizer spreader generally indicated by reference numeral 10 including a steel base frame structure 12 substantially rectangular in shape with downwardly extending flanges that surround drive mechanism shown by FIGS. 4, 5 and 6. A tubular support 14 is suitably secured by welding or screws to the base frame structure 12. A light-weight fiberglass hopper 16 is suitably secured to the tubular support. This hopper 16 has three metering holes 17, 18 and 19 in the bottom thereof. The hopper 16 with the metering holes is commercially available as a Scott RX-7.

A tubular handle means 20, 21 is secured to the tubular support 14 by welding or screw fasteners. Handle grip portions 22, 23 are located laterally outwardly and substantially parallel to levers 24 and 25 pivoted by pins 26, 27 through webs 28, 29. A rod 30 with an enlarged knob 31 is guided by a cross-piece 32 interconnecting the tubular handle means 20, 21. The lever 25 and rod 30 are suitably connected with means to control (1) the engagement of the transmission and (2) the opening of the holes in the bottom of the hopper 16. A gasoline engine 34 is commercially available from Briggs and Stratton Corp., Milwaukee, Wisconsin 53201 and is set at a constant R.P.M. via a screw type throttle (standard engine equipment). The engine is a Series 60100 gasoline motor rated at 2 HP at 3600 R.P.M. An oil-form air cleaner 35 and a gas tank 36 having at least one-half gallon capacity are provided with the engine 34 having an exhaust muffler 38.

A vertical shaft 39 is suitably journalled by a bearing on the base frame structure 12. An impeller blade 40 is carried and secured by a set screw to an upper end of the shaft 39. The impeller blade 40 is located below the holes 17, 18 and 19 in the bottom of the hopper 16. Fast rotation of the shaft 39 with the impeller blade 40 on its end results in extra wide pattern dispersal of dry fertilizer flowing through the metering holes 17, 18 and 19 in a well known manner. The hopper 16 is capable of holding up to 60 pounds of dry fertilizer. A shield S is located to one side of the impeller blade 40 and guards against any dry fertilizer being dispersed by centrifugal force against the engine 34.

Four wheels 41, 42, 43, and 44 having tires 45, 46 with stubby wide tread lug configuration for good traction on the front and tires 47, 48 with a more narrow linear tread configuration on the rear are provided to support the dry fertilizer spreader capable of being loaded with up to 60 pounds of dry fertilizer.

FIG. 4 shows the axles or shafts 51, 52, 53 and 54 with hubs 51H, 52H, 53H, and 54H having the wheels 41, 42

43, and 44 rotatably journalled relative to the base frame structure in a suitable manner. A coupling 56 connects a gear reducer 57 adjoining the engine 34 with a transmission 58. Opposite output shafts 59 from the transmission 58 have sprocket gears 60 fixed thereon. These sprocket gears 60 mesh with parallel chains 61 which drivingly and positively engage further sprocket gears 62 that are fixed to the shafts 51, 52 to transmit propelling force to the front wheels 41, 42. A steel bevel gear 64 located centrally of the shafts 51, 52 simultaneously transmits operating force to another steel bevel gear 66 (each 12 pitch) in mesh therewith. The bevel gear 66 is positively drivingly connected to the vertical shaft 39 which carries the impeller blade 40 in a timing and revolution interconnection between the front wheel drive and the impeller blade 40.

FIG. 7 shows an engine tray 68 joined to the base frame structure 12 and forming a compact recess at a lower rear located to assure low center of gravity of mass of the engine 14 to facilitate motorized spreader operation along embankments.

No basis for comparison exists as to a self-propelled lawn mower or snow thrower (blower). The problem of individual fatigue precluding uniform dry fertilizer spreader is unique. The novel combination of features of the present invention solves a problem existing for lawn service companies. Optionally a light weight belly pan 70 can be provided to one side of the engine tray 68 also provision can be made for reverse functioning of the spreader. The shifting mechanism can include two lever positions.

There is also noted that the coupling engine, gear reduction, coupling, transmission as well as the sprocket and chain means are all suitably at the same level below the surface of the base frame structure. This further assures economical manufacture and compact arrangement of parts, together with the maintenance of a low center of gravity as mentioned previously in this description.

Also, between the engine 34 and transmission 58 there is a limited slip device or coupling 56 which transmits the torque transferred from the engine 34 to the transmission 58 and the drive train assembly including the gears, shafts and the like described in detail previously in this specification.

FIGS. 8, 9, 10 and 11 of the drawings show a further embodiment of a power lawn spreader corresponding to views of FIGS. 1, 2, 3 and 4 respectively. Reference numeral designations for similar parts are increased by 100 added to the original reference numeral designations.

As clearly shown in FIGS. 8 and 9, there are two control rods 130 and 131 for actuation transmission 158 and hopper opening control. The rod 131 has a lower end 131' articulately joined in linkage to an arm 131" connected to a 3-hole disc means for controlling hopper opening and closing. A handle 132 is pivotally joined to the rod 131 at an upper end thereof readily accessible by an operating individual from the handles 122, 123. An articulated linkage 130' between the rod 130 and transmission 158 is also provided as best seen in FIG. 8. A welded sheet metal chassis and hood-like unitary hopper mounting 114 in the form of a solid steel stamping is provided differing from the tubing structure in FIG. 1. A tapered deck 112 is provided below the impeller blade 140 so that dry fertilizer will not collect or build up. A chute or door member 115 including a latch 115' are provided on the hopper 116 as shown in FIG. 10 to facilitate emptying of the hopper 116 or for changing dry fertilizer material therein. An annular shield 156' is bolted to a chassis platform or tray portion 168 and surrounds the limited slip device or coupling 156.

It is, of course, to be understood that the present invention is, by no means, limited to the specific showing in the drawings, but also comprises any modifications within the scope of the appended claims.

What I claim is

1. In an impeller blade fertilizer spreader exclusively power driven itself and having a large capacity hopper with metering holes in a bottom thereof, the improvement in combination therewith which comprises: a substantially rectangular base frame structure, an engine carried at a rear location of said frame structure, a transmission with opposite outwardly extending output shafts suitably journalled relative to said frame structure, a handle means with rod and lever controls for the operation of the hopper metering holes and transmission, four wheels rotatably journalled in pairs with front and rear axle means on said frame structure, gear reduction means on one side of said engine, a limited slip coupling device operatively connected to said gear reduction means, a first pair of sprocket gears secured to the output shafts respectively, a second pair of sprocket gears secured to front axles means, parallel chain members interconnecting respectively said first pair of sprocket gears and in mesh with said second pair of sprocket gears, an impeller blade on a top end of a vertical shaft rotatably journalled on said frame structure to locate the impeller blade rotatably underneath the metering holes of the hopper, and bevel gear means simultaneously timing and interconnecting rotation of said impeller blade with only front wheel drive of the fertilizer spreader.

2. An impeller blade fertilizer spreader in combination according to claim 1, in which a rod and lever engagement is provided for positive control of the motorized front wheel drive combined with the timing and revolution interconnection to the impeller blade of the fertilizer spreader.

3. An impeller blade fertilizer spreader in combination according to claim 1, in which said frame structure includes a rear engine tray forming a compact recess for low center of gravity mounting of said engine.

4. An impeller blade fertilizer spreader in combination according to claim 3, in which a shield is mounted on said frame structure to block dry fertilizer spreading from said engine.

5. An impeller blade fertilizer spreader in combination according to claim 4 in which said engine has at least a one-half gallon fuel container thereon.

6. An impeller blade fertilizer spreader in combination according to claim 1, in which a tubular support is provided for said hopper.

7. An impeller blade fertilizer spreader in combination according to claim 6, in which said hopper is made of light-weight fiberglass shifted rearwardly toward said engine.

8. An impeller blade fertilizer spreader in combination according to claim 1, in which said front drive wheels are studded and the rear wheels are straight and more narrow than said front drive wheels.

9. An impeller blade fertilizer spreader in combination according to claim 1, in which said coupling device, transmission, bevel gear means, sprocket gears and said parallel chains are underneath said frame structure in a location shielded from said impeller blade.

10. An impeller blade fertilizer spreader in combination according to claim 1, in which an oil-foam air filter is mounted on said engine in an elevated position, and an exhaust muffler located below said air filter.

11. An impeller blade fertilizer spreader in combination according to claim 1, in which a hood-like unitary hopper mounting in the form of a solid steel stamping is provided for the hopper.

12. An impeller blade fertilizer spreader in combination according to claim 1, in which said coupling device limits torque transferred from said engine to said transmission for impeller blade and front wheel drive.

13. An impeller blade fertilizer spreader in combination according to claim 1, in which a door-chute means is journalled with said hopper to facilitate changing fertilizer materials and emptying of the hopper.

14. An impeller blade fertilizer spreader in combination according to claim 1, in which a welded sheet metal chassis and hopper mount is provided.

15. An impeller blade fertilizer spreader in combination according to claim 1, in which a tapered deck is provided below said impeller blade so that fertilizer material is precluded from collecting and building-up thereon.

16. An impeller blade fertilizer spreader in combination according to claim 14, in which an annular shield is bolted to said chassis and hopper mount, said shield surrounding said coupling device protected thereby against fertilizer material dropping thereon.

17. An impeller blade fertilizer spreader in combination according to claim 15, in which said impeller blade is of stainless steel above said tapered deck.

18. An impeller blade fertilizer spreader in combination according to claim 13, in which said door-chute means is located substantially above said impeller blade.

19. An impeller blade fertilizer spreader in combination according to claim 14, in which said engine is mounted on a rear platform extension of said chassis and hopper mount for a lower center of gravity.

20. An impeller blade fertilizer spreader in combination according to claim 19 in which said engine, said coupling device and transmission are all substantially at the same level.

* * * * *